US012578532B2

(12) United States Patent
Wang et al.

(10) Patent No.: US 12,578,532 B2
(45) Date of Patent: Mar. 17, 2026

(54) FABRICATING PHOTONIC DEVICES FROM BULK SUBSTRATE

(71) Applicant: IONQ INC., College Park, MD (US)

(72) Inventors: Zhuoxian Wang, Cambridge, MA (US); Bartholomeus Johannes Machielse, Somerville, MA (US)

(73) Assignee: IONQ INC., College Park, MD (US)

( * ) Notice: Subject to any disclaimer, the term of this patent is extended or adjusted under 35 U.S.C. 154(b) by 304 days.

(21) Appl. No.: 18/193,997

(22) Filed: Mar. 31, 2023

(65) Prior Publication Data

US 2026/0050119 A1 Feb. 19, 2026

(51) Int. Cl.
| *G02B 6/136* | (2006.01) |
| *B82Y 20/00* | (2011.01) |
| *G06N 10/40* | (2022.01) |
| *G02B 6/12* | (2006.01) |

(52) U.S. Cl.
CPC .............. *G02B 6/136* (2013.01); *B82Y 20/00* (2013.01); *G06N 10/40* (2022.01); *G02B 2006/121* (2013.01); *G02B 2207/101* (2013.01)

(58) Field of Classification Search
CPC ................ G02B 6/12004; G02B 6/136; G02B 2006/121; G02B 2207/101; B82Y 20/00; G06N 10/40
See application file for complete search history.

(56) References Cited

U.S. PATENT DOCUMENTS

| 6,542,682 B2 | 4/2003 | Cotteverte |
| 6,990,282 B2 | 1/2006 | Russell |
| 7,805,030 B2 | 9/2010 | Bratkovski |

(Continued)

OTHER PUBLICATIONS

Matthew Mitchell, et al, "Realizing Q> 300 000 in diamond microdisks for optomechanics via etch optimization," APL Photonics, Cite as: APL Photonics 4, 016101 (2019); https://doi.org/10.1063/1.5053122 Submitted: Aug. 21, 2018 • Accepted: Dec. 19, 2018 • Published Online: Jan. 11, 2019, pp. 1-12.

(Continued)

*Primary Examiner* — Daniel Petkovsek
(74) *Attorney, Agent, or Firm* — Dickinson Wright PLLC

(57) ABSTRACT
A fabrication process for fabricating, from a bulk substrate material, devices configured to interface with light is described. Sequential directionally-dependent etching process steps may be used to form interior features of a given device prior to undercutting remaining portions of the bulk substrate material in order to locally isolate the formed device from the remaining portions of the bulk substrate material. Layers of conformally deposited material may be used to protect the interior features from being unintentionally etched during said undercutting step(s). Such devices fabricated from bulk substrate material may be used in photonics, for example, in which interior features may be patterned into a bulk substrate material rather than into a thin film in order to preserve higher-quality material properties (e.g., for diamond). Collectively, interior features of such a photonics device may be configured to act as a photonic cavity to store and/or capture light with improved performance.

8 Claims, 8 Drawing Sheets

Mask and conformal deposition material removal
*908* undercutting of substrate *900* channel width *902* planar surface *904* remaining substrate *906*

Receive a bulk substrate to be used to fabricate a device configured to interact with light
*1300*

Remove material from the bulk substrate to form first and second side surfaces of the device and remove material from a portion of the bulk substrate between the first and second side surfaces to form interior feature(s) of the device
*1302*

Remove remaining portions of the bulk substrate extending beyond the depth of the interior feature(s) of the device to form a continuous channel, causing a planar surface on the bottom surface of the device to be formed from the removal of the remaining portions
*1304*

(56) References Cited

U.S. PATENT DOCUMENTS

| | | | | |
|---|---|---|---|---|
| 8,798,414 B2 * | 8/2014 | Quan | ...................... | B82Y 20/00 |
| | | | | 385/10 |
| 9,177,814 B2 * | 11/2015 | Chang | ................... | H01L 21/304 |
| 9,991,113 B2 | 6/2018 | Kim | | |
| 10,578,891 B1 * | 3/2020 | Schmeing | .............. | H04B 10/70 |
| 10,822,693 B2 | 11/2020 | Okahisa | | |
| 11,211,283 B2 * | 12/2021 | Singh | ................... | H10D 62/115 |
| 11,423,951 B2 * | 8/2022 | Kim | ....................... | G11C 5/063 |
| 2022/0269974 A1 * | 8/2022 | Bhaskar | ................. | G02F 3/024 |

OTHER PUBLICATIONS

Sara Mouradian, et al., "Rectangular Photonic Crystal Nanobeam Cavities in Bulk Diamond," arXiv preprint: arXiv:1704.07918v1 [physics.app-ph] Apr. 25, 2017, pp. 1-6.

* cited by examiner

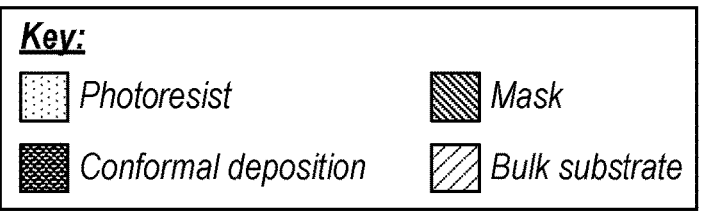
Key:
⬚ Photoresist     ▨ Mask
▨ Conformal deposition     ▨ Bulk substrate
*(side view cross-sections:)*
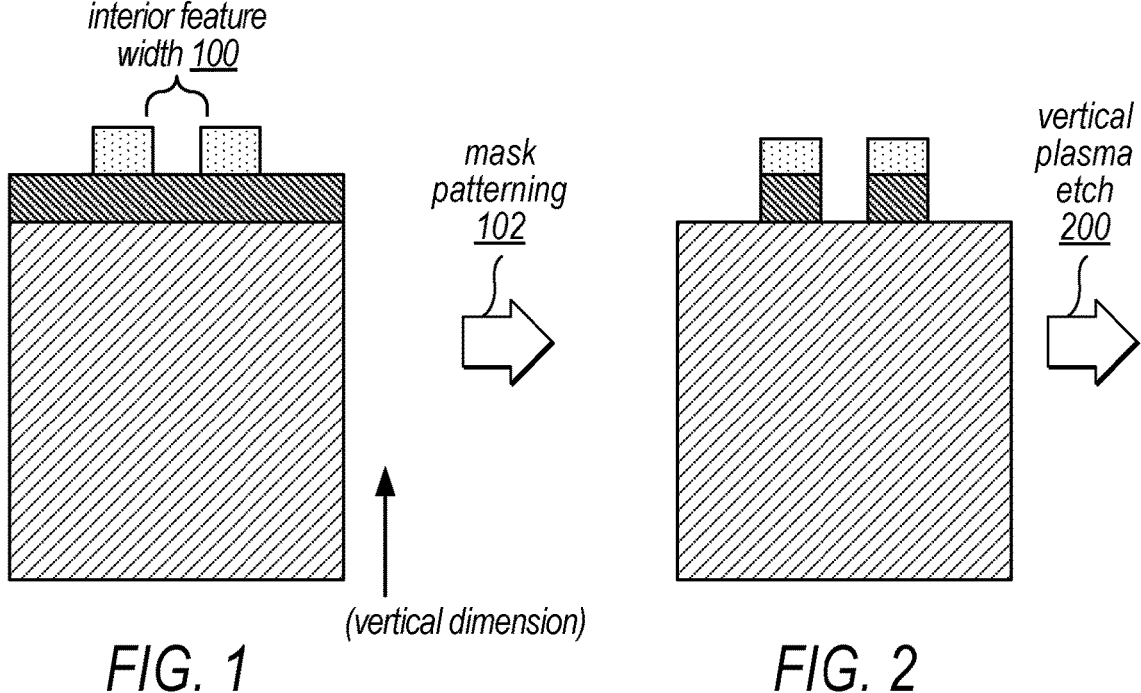
*interior feature width 100*
*mask patterning 102*
*vertical plasma etch 200*
*(vertical dimension)*
FIG. 1        FIG. 2
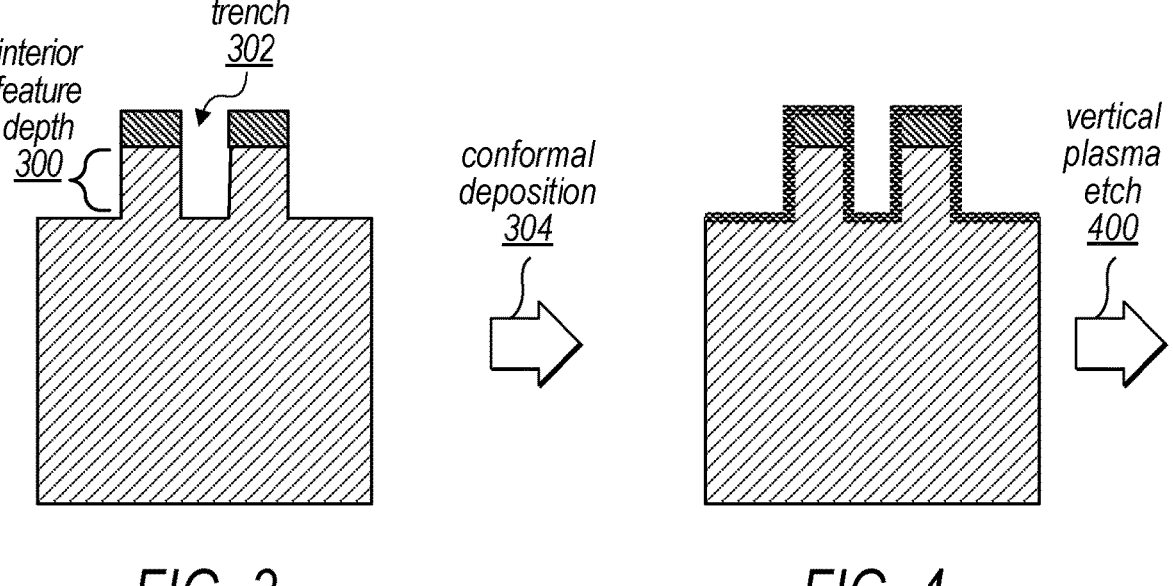
*trench 302*
*interior feature depth 300*
*conformal deposition 304*
*vertical plasma etch 400*
FIG. 3        FIG. 4

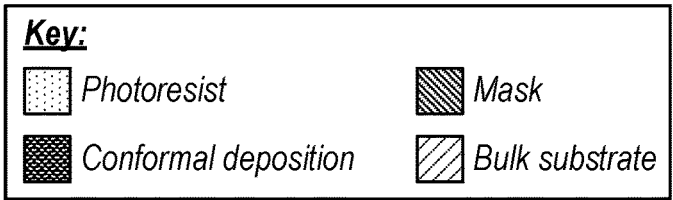
Key:
☐ Photoresist     ▨ Mask
▨ Conformal deposition     ▨ Bulk substrate
*(side view cross-sections:)*
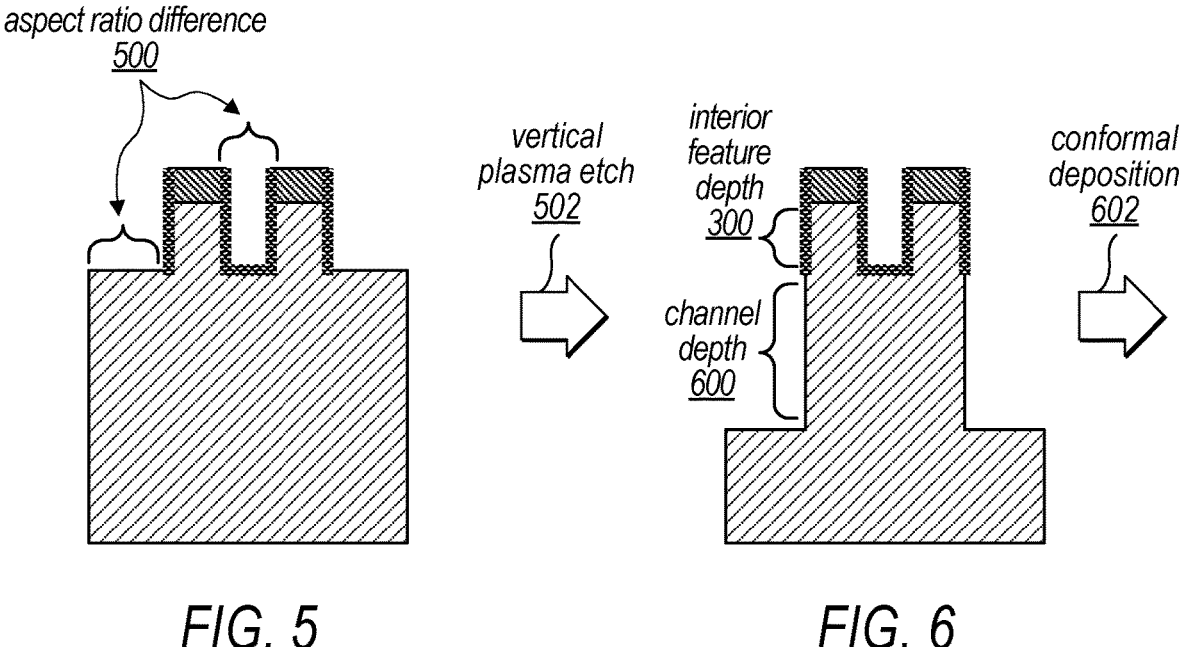
aspect ratio difference
*500*
vertical plasma etch
*502*
interior feature depth
*300*
channel depth
*600*
conformal deposition
*602*
FIG. 5           FIG. 6
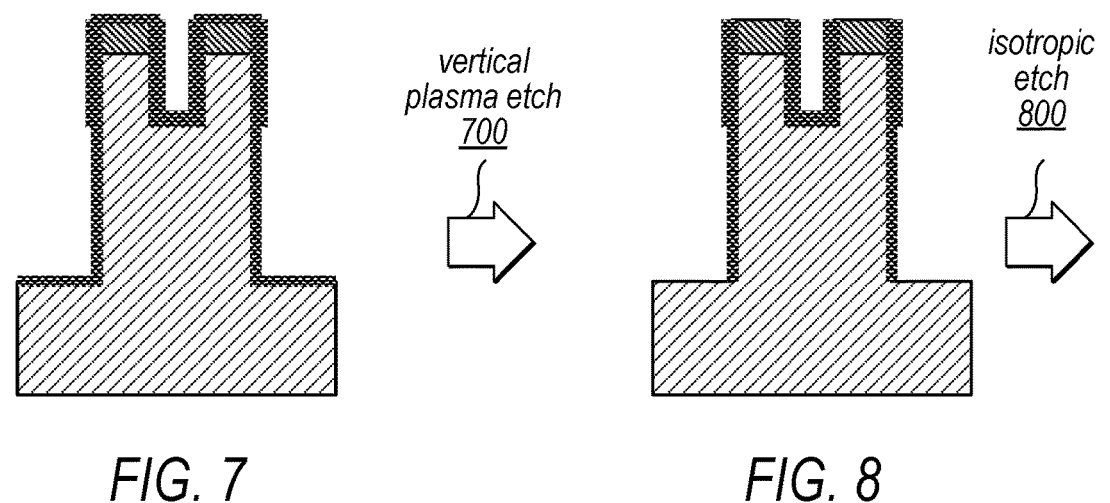
vertical plasma etch
*700*
isotropic etch
*800*
FIG. 7           FIG. 8

Key:

▦ Photoresist    ▨ Mask

▩ Conformal deposition    ▧ Bulk substrate (side view cross-sections:)

Mask and conformal
deposition material
removal
908 undercutting
of substrate
900 channel
width
902 planar
surface
904 remaining substrate 906 device 1000 through-hole 1002

(top view of device 1000 with
remaining substrate 906 removed)

interior feature
width 100 side view cross-section:

*(3D view of device 1000 with remaining substrate 906 removed)* top surface
1202 interior features
1200 side surface
1208 side surface
1204 bottom surface
1206

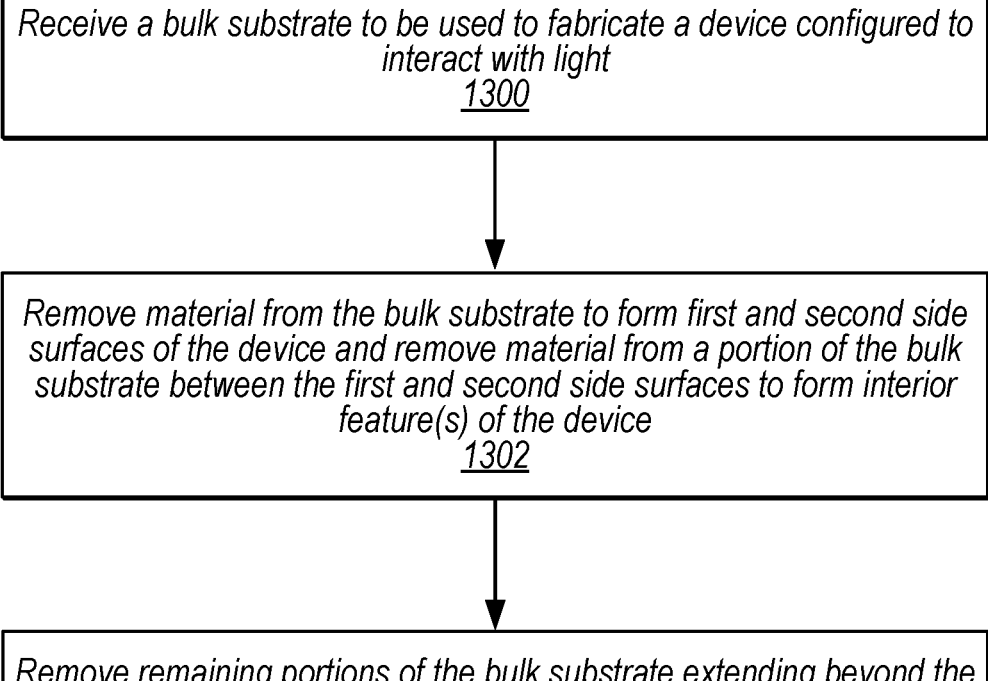

*Receive a bulk substrate to be used to fabricate a device configured to interact with light*
*1300*

*Remove material from the bulk substrate to form first and second side surfaces of the device and remove material from a portion of the bulk substrate between the first and second side surfaces to form interior feature(s) of the device*
*1302*

*Remove remaining portions of the bulk substrate extending beyond the depth of the interior feature(s) of the device to form a continuous channel, causing a planar surface on the bottom surface of the device to be formed from the removal of the remaining portions*
*1304*

*FIG. 13*

*Fabricated device (e.g., quantum information storage device) 1400*

(top view)

*Bulk substrate material 1402*

*Single quantum memory 1404*

SiV

*Fabricated device (e.g., Bragg grating) 1500*

(side view cross-section)

*Bulk substrate material 1502*

*Fabricated device (e.g., photonic metamaterial) 1600*

(top view)

*Bulk substrate material 1602*

FABRICATING PHOTONIC DEVICES FROM BULK SUBSTRATE

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the sum of squared absolute values of the complex numbers (e.g., $|x|^2+|y|^2$) must sum to one. Each of the two complex numbers (e.g., x and y) is called an amplitude, and their respective quasi-probabilities are the squared absolute values of the complex numbers (e.g., $|x|^2$ and $|y|^2$, respectively). Hence, the square of the absolute value of each complex number corresponds to the probability of event zero or event one happening. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

There are different types of qubits that may be used in quantum computers, each having different advantages and disadvantages. For example, some quantum computers may include qubits built from superconductors, trapped ions, semiconductors, photons, etc. Each may experience different levels of interference, errors and decoherence. Also, some may be more useful for generating particular types of quantum circuits or quantum algorithms, while others may be more useful for generating other types of quantum circuits or quantum algorithms.

BRIEF DESCRIPTION OF THE DRAWINGS

FIG. 1 illustrates a side-view cross-section of a bulk substrate material, wherein a mask deposition is applied and lithography is performed as part of a fabrication process described via FIGS. 1-12 herein, according to some embodiments.

FIG. 2 illustrates a result of patterning the mask deposited onto the bulk substrate material as part of a fabrication process described via FIGS. 1-12 herein, according to some embodiments.

FIG. 3 illustrates a formation of a feature (e.g., a trench surrounded by material of the bulk substrate) into the bulk substrate material as part of a fabrication process described via FIGS. 1-12 herein, according to some embodiments.

FIG. 4 illustrates a result of a conformal deposition as part of a fabrication process described via FIGS. 1-12 herein, according to some embodiments.

FIG. 5 illustrates a removal of portions of the conformally deposited material as part of a fabrication process described via FIGS. 1-12 herein, according to some embodiments.

FIG. 6 illustrates a removal of additional portions of the bulk substrate material in order to begin forming a continuous channel below the feature as part of a fabrication process described via FIGS. 1-12 herein, according to some embodiments.

FIG. 7 illustrates a result of another conformal deposition as part of a fabrication process described via FIGS. 1-12 herein, according to some embodiments.

FIG. 8 illustrates another removal of portions of the conformally deposited material as part of a fabrication process described via FIGS. 1-12 herein, according to some embodiments.

FIG. 13 is a flowchart illustrating a process of fabricating features using bulk substrate material, according to some embodiments.

Figures 9, 10, 11:
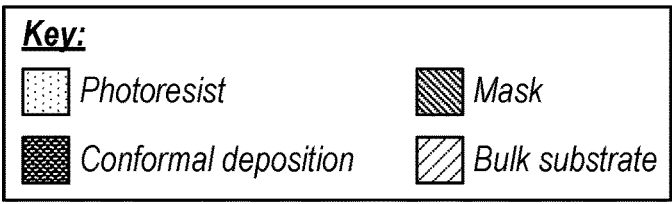
FIG. 9 illustrates a result of undercutting the bulk substrate material to continue forming the continuous channel as part of a fabrication process described via FIGS. 1-12 herein, according to some embodiments.
FIG. 10 illustrates a result of removing mask and conformal deposition material as part of a fabrication process described via FIGS. 1-12 herein, according to some embodiments.
FIG. 11 illustrates a top view of a device fabricated via a fabrication process described in FIGS. 1-12 herein, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for fabricating features of a device (e.g., features for a quantum information storage device, a Bragg grating device, a photonic metamaterial device, etc.) from bulk substrate material. At present, it may be difficult to produce thin films of certain materials, even via state-of-the-art nanofabrication techniques, that have material properties of a quality that is on par with material properties of bulk material of the same certain materials. For example, within the photonics domain, materials such as diamond may be used as part of a quantum memory device that is configured to capture and store quantum information via incoming super-positioned particles of light. More specifically, diamond may be patterned, via fabrication techniques, such that quantum information storage devices (e.g., photonic cavities, etc.) may be used to store said quantum information. However, a use of thin film diamond may lead to high loss rates of photons (e.g., photons are not captured via the device at a high enough efficiency/frequency to transfer quantum information, photons "leak" out of the device due to unintentional material defects, etc.) if the material properties and/or quality parameters of thin film diamond are not of a given high quality.

If, instead, a given device and corresponding features of the device are fabricated from bulk substrate material rather than from a thin film to preserve material properties of a higher quality bulk substrate material, it is important that surfaces of the device are smooth (e.g., without roughness, texture, etc.) and planar (e.g., straight, level, and without a substantial slant or tilt). Methods and techniques described herein relate to fabricating devices from bulk substrate material which may then be configured to interact with light. As such, high quality material properties of bulk substrate material may be utilized while also ensuring that fabricated surfaces of the device are smooth, planar, and free of texture that may also inhibit the various intended interactions with light such that there may be improved device performance and functionality in comparison to previously used fabrication techniques (e.g., ion mill techniques, etc.).

As pertaining to the discussion herein, a person having ordinary skill in the art should understand that a "bulk substrate" of a given material may refer to an amount of the given material that has a thickness on the order of at least micrometers, and that, by contrast, a "thin film" may refer to a thickness of up to several orders of magnitude smaller than the bulk substrate. For example, a thin film may refer to an amount of material with a thickness between approximately 50 nm and 2 μm thick, while a bulk substrate may refer to an amount of material with a thickness of at least 2 μm, according to some embodiments.

This written description continues with a general description of embodiments fabrication techniques for patterning features into bulk substrate material in order to form various devices, followed by methods for incorporating such fabrication techniques into applications of various devices. Finally, a description of an example computing system upon which the various components, modules, systems, and/or devices may be implemented is provided. Various examples are provided throughout the specification. A person having ordinary skill in the art should understand that the previous and following description of fabrication processes for patterning features into bulk substrate material are not to be construed as limiting as to the implementation of said processes, or portions thereof.

In some embodiments, a fabrication protocol for patterning features into bulk substrate material such that device 1000 is formed may resemble that which is shown in FIGS. 1-12. A "Key" has been provided such that a reader may differentiate between a bulk substrate material, a photoresist material, a mask material, and a conformally deposited material. Furthermore, a "vertical dimension" has been labeled in FIG. 1 for ease of discussion herein. A person having ordinary skill in the art should understand that FIGS. 1-10 are meant to be side view cross-sections and therefore dimensions right/left along the figure page and into/out of the figure page refer to the additional two of three spatial dimensions. Such labels are meant for ease of discussion herein and could equally be labeled as first, second, and third dimensions, etc. in order to differentiate such terms. In addition, such labels may carry through to discussion of a "top" surface and a "bottom" surface. For example, a top surface of a bulk substrate may be used to reference a surface in the vertical dimension upon which photoresist is deposited, as shown in FIG. 1, and a bottom surface of said bulk substrate may refer to the opposing side, according to some embodiments (see also FIG. 12). Thickness and/or depth of thin films and bulk substrates, as introduced above, may also refer to thickness in the vertical dimension as labeled in FIG. 1, according to some embodiments.

FIG. 1 illustrates a side-view cross-section of a bulk substrate material, wherein a mask deposition is applied and lithography is performed on the bulk substrate material, and FIG. 2 illustrates a result of patterning the mask deposited onto the bulk substrate material, both as part of a fabrication process described via FIGS. 1-12 herein, according to some embodiments.

In some embodiments, FIGS. 1 and 2 may demonstrate a lithographic process step in which a photoresist material may be deposited onto a top surface of a bulk substrate and then patterned according to a mask pattern in order to transfer said mask onto the top surface of the bulk substrate. A mask patterning 102 step may be used, at least in part, to pattern trench 302 into the bulk substrate material, according to some embodiments. As shown in FIGS. 1 and 3, interior feature width 100, which may be designed via a given masking pattern for mask patterning 102, sets a width dimension of trench 302 and, by extension, a width of through-hole 1002. In some embodiments, "interior features" of device 1000 may refer to three-dimensional shapes of said features following photoresist and conformal deposition material removal 908, and trench 302, for example, may refer to an intermediary shape that will result in said interior features following a fabrication process described via FIGS. 1-12 herein (see also trench 302 vs through-hole 1002). A person having ordinary skill in the art should understand that such terms have been chosen for ease of discussion of stages of fabrication processes described herein, and are not meant to be misconstrued as restrictive.

A person having ordinary skill in the art should also understand that a result of patterning a mask via mask patterning 102 may result from one or more sequential lithographic processing step(s), in which photoresist is spun onto the bulk substrate material shown in FIG. 1 such that a top surface of said bulk substrate material has a coating of photoresist, then the photoresist is exposed to UV light such that photosensitive properties of the photoresist are altered according to a mask pattern. Next, a developing solution may be used, resulting in some portions of the original photoresist coating being removed and some portions of the original photoresist coating remaining, as shown in FIG. 1, and according to a type of positive or negative photoresist used during the given lithography processing step. In some embodiments described herein, masking and/or other fabrication-related process steps may refer to various types of photolithography, Electron-beam (E-beam) lithography, etc., and such terms should not be misconstrued as limiting in the discussion herein.

A person having ordinary skill in the art should also understand that developing solutions and/or etching solutions, as used in the discussion herein, may be "selective," as they may etch one or more materials (e.g., a given etching solution may cause portions of a bulk substrate material to be removed) but not one or more other materials (e.g., the given etching solution that removes portions of the bulk substrate material may not cause the photoresist material to be removed), according to some embodiments. Furthermore, example embodiments using a vertical plasma etching technique (e.g., vertical plasma etch 200, 400, 502, 700, etc.) are shown throughout FIGS. 1-12, however other forms of wet etching (e.g., chemical etching) and/or dry etching (e.g., plasma/gas etching) procedures that may produce similar results may alternatively be used in other embodiments of a fabrication process described via FIGS. 1-12, and therefore the discussion herein should not be misconstrued as limiting.

In some embodiments, FIGS. 2 and 3 may respectively resemble a moment before and a moment after an etching process step such as vertical plasma etch 200, resulting in a formation of a given feature such as trench 302.

FIG. 3 illustrates a formation of a feature (e.g., a trench surrounded by material of the bulk substrate) into the bulk substrate material as part of a fabrication process described via FIGS. 1-12 herein, according to some embodiments.

In some embodiments, vertical plasma etch 200 may resemble any directionally-dependent etching technique that may result in portions of the bulk substrate material being removed without removing the photoresist material shown in FIGS. 2 and 3 (e.g., a reactive ion etching (RIE) technique, another anisotropic etching technique, etc.). As shown in FIG. 3, vertical plasma etch 200 removes exposed portions of the bulk substrate material that are not vertically underneath photoresist portions following the mask patterning 102 step in order to form side surfaces of device 1000 and to form interior features between said side surfaces (e.g., trench 302).

In some embodiments, vertical plasma etch 200 may be applied for a given duration of time such that the portions of a top surface of the bulk substrate material are removed up to an interior feature depth 300, wherein interior feature depth 300 may be referred to as a "target" depth for a feature ultimately described as through-hole 1002. In some embodiments, through-hole 1002 has a same depth as interior feature depth 300: as shown in at least the following figures, interior feature depth 300 may remain the depth of trench

302 throughout the following fabrication steps leading to a formation of through-hole 1002 of device 1000. In some embodiments, it may be advantageous to form trench 302 to its desired depth via vertical plasma etch 200 such that, as shown via undercutting of substrate 900 in FIG. 9, through-hole 1002 retains a same depth as interior feature depth 300 without requiring additional fabrication steps to alter said depth to a final or subsequent depth.

FIG. 4 illustrates a result of a conformal deposition as part of a fabrication process described via FIGS. 1-12 herein, according to some embodiments.

In some embodiments, an additional material may be deposited via conformal deposition 304 in order to protect dimensions of trench 302 (e.g., interior feature width 100, interior feature depth 300, and sidewalls of trench 302) during subsequent fabrication processing steps. Conformal deposition 304 may resemble deposition via an atomic layer deposition (ALD) technique or any other similar technique that uniformly deposits a layer of material along exposed top surfaces shown in FIG. 3 (e.g., a chemical vapor deposition (CVD) technique, wet processes, etc.).

FIG. 5 illustrates a removal of portions of the conformally deposited material as part of a fabrication process described via FIGS. 1-12 herein, according to some embodiments.

In some embodiments, vertical plasma etch 400 may be performed such that certain portions of the conformally deposited material are removed while other portions of the conformally deposited material remain deposited. As shown in FIG. 5, vertical plasma etch 400 may resemble a directional, anisotropic reactive ion etching processing step which may result in portions of the bulk substrate material extending outwards from the outer side surfaces of trench 302 being removed while inner side surfaces and bottom surface of trench 302 remain coated with the conformally deposited material. Such an effect may be due, at least in part, on etching rates of different exposed portions of the structure. For example, while trench 302 is coated in a layer of the conformally deposited material, as shown in FIGS. 4 and 5, an exposed bottom surface of said feature has a width that is smaller than interior feature width 100. In contrast, portions of the bulk substrate material extending outwards from the outer side surfaces of trench 302 have much larger widths, as indicated via aspect ratio difference 500. As such, the respective portions of the bulk substrate material extending outwards may etch faster than the current exposed width of trench 302.

Furthermore, the current exposed width of trench 302 is located at the bottom of a narrow trench in which interior feature depth 300 may be larger than the current exposed width of trench 302, and therefore will etch much slower than the portions of the bulk substrate material extending outwards from the outer side surfaces of trench 302, as trench 302 has a high aspect ratio. In some embodiments, vertical plasma etch 400 may therefore be timed such that said processing step is a long enough duration of time for the conformally deposited material to be removed from portions of the bulk substrate material extending outwards from the outer side surfaces of trench 302 and from top surfaces of the photoresist material, but a short enough duration of time such that the conformally deposited material remains deposited on inner side surfaces and the bottom surface of trench 302. A timing of vertical plasma etch 400 may be determined based, at least in part, on a selection of the conformally deposited material, a particular vertical plasma etching technique, and aspect ratio differences between features of a given device being formed.

In some embodiments, vertical plasma etch 502, conformal deposition 602, vertical plasma etch 700, and isotropic etch 800, as further described in the following paragraphs, may be used to form a continuous channel having channel depth 600 and channel width 902.

FIG. 6 illustrates a removal of additional portions of the bulk substrate material in order to begin forming a continuous channel below the feature as part of a fabrication process described via FIGS. 1-12 herein, according to some embodiments.

In some embodiments, additional portions of the bulk substrate material located beyond outer side surfaces of device 1000 that extend to a depth larger than interior feature depth 300 may be removed via vertical plasma etch 502, as shown in FIG. 6. In addition, vertical plasma etch 502 may be selective such that (1) inner side surfaces and bottom surface of trench 302 remain coated (e.g., said surfaces are not etched) with the previously deposited conformal deposition material; (2) outer side surfaces of trench 302 remain coated with the conformal deposition material up to a depth of interior feature depth 300; and (3) exposed surfaces of the bulk substrate (e.g., surfaces of the bulk substrate not currently coated in the conformally deposited material) at a moment in time depicted via FIG. 5 are further etched to a depth that is vertically below interior feature depth 300 (e.g., channel depth 600). This may be due, at least in part, to a concept of aspect ratios, as introduced above.

FIG. 7 illustrates a result of another conformal deposition as part of a fabrication process described via FIGS. 1-12 herein, according to some embodiments.

In some embodiments, conformal deposition 602 may resemble an additional deposition processing step in which an additional layer of a same material as deposited during conformal deposition 304 may be deposited onto top surfaces depicted in FIG. 6, resulting in a deposition shown in FIG. 7. Conformal deposition 602 may be completed via any of the above described techniques that lead to a result shown in FIG. 7 (e.g., atomic layer deposition, chemical vapor deposition, etc.). Furthermore, inner side surfaces, outer side surfaces, and the bottom surface of trench 302 were currently coated in a first layer of the conformally deposited material at a moment in time depicted in FIG. 6, and therefore said surfaces may be coated in first and second layers following conformal deposition 602, while other surfaces depicted in FIG. 6 may be coated in the second layer, as also shown in FIG. 7. A person having ordinary skill in the art should understand that, at a moment in time depicted in FIG. 7, an exposed bottom surface of trench 302 now has a width that is yet even smaller than the width described with regard to FIGS. 4 and 5 herein (which is additionally smaller than interior feature width 100), providing additional protection during subsequent etching process steps.

FIG. 8 illustrates another removal of portions of the conformally deposited material as part of a fabrication process described via FIGS. 1-12 herein, according to some embodiments.

In some embodiments, a further etching process step, such as vertical plasma etch 700, may then be conducted such that the second layer of the conformally deposited material, deposited via conformal deposition 602, is removed from surfaces of the bulk substrate at a depth equal to interior feature depth 300 added to channel depth 600 and from top surfaces of the photoresist material, as shown in FIG. 8. As described above with regard to FIG. 5 and aspect ratio difference 500, the first and second layers of the conformally deposited material may remain deposited on the inner side surfaces, outer side surfaces, and the bottom surface of trench 302 following vertical plasma etch 700, and a duration of time of vertical plasma etch 700 may be determined, at least in part, according to said aspect ratio difference.

Furthermore, fabrication process steps described via vertical plasma etch 502, conformal deposition 602, and vertical plasma etch 700 may be repeated any number of times in order to form features of various depths prior to a formation of a continuous channel via isotropic etch 800. For example, in some embodiments in which device 1000 includes an additional feature having a depth deeper than interior feature depth 300 but less than a depth equal to interior feature depth 300 added to channel depth 600, a process described via vertical plasma etch 502, conformal deposition 602, and vertical plasma etch 700 may be repeated in order to form said additional feature. In such embodiments, a depth of device 1000 may be determined to be equal to a depth of the most vertically deep feature, and channel depth 600 may then begin from this depth. For example, in embodiments shown in FIG. 6, interior feature depth is the largest depth of features that are being formed to fabricate device 1000, and therefore interior feature depth 300 may be considered as a vertical depth of device 1000. As such, a continuous channel may be formed starting at a depth of interior feature depth 300 and continuing vertically downwards.

In some embodiments, it may be advantageous to isolate device 1000 from remaining portions of the bulk substrate material, and therefore a continuous channel having a width of channel width 902 (e.g., a free-space and continuous channel that is uninterrupted within a width spanning channel width 902) and a depth of at least channel depth 600 may be formed. In some embodiments, channel width 902 may also be referred to as a width of device 1000. A person having ordinary skill in the art should understand that during a fabrication process such as that which is described via FIGS. 1-12 herein, "isolating" a device may refer to locally suspending said device from portions of the bulk substrate surrounding the formed device, and that the device may still be cantilevered or otherwise attached to the bulk substrate in at least one other additional region of the bulk substrate (see also description pertaining to FIGS. 9 and 10 herein). In embodiments, "isolating" a device may refer to "air-gapping" a device, in which an amount of free space or air is fabricated between device 1000 and remaining substrate 906. In other embodiments, "isolating" may refer to an optical isolation (see also description pertaining to fabricated device 1500 herein). In yet other embodiments, "isolating" a device may refer to "releasing" device 1000 from remaining substrate 906 such that it does not remain cantilevered or otherwise attached to the bulk substrate (e.g., wherein device 1000 may resemble a photonic cavity, and, following such an isolation from remaining bulk substrate material, device 1000 may be bonded or otherwise coupled to additional components of a quantum memory device, and apart from the remaining bulk substrate material).

FIG. 9 illustrates a result of undercutting the bulk substrate material to continue forming the continuous channel as part of a fabrication process described via FIGS. 1-12 herein, according to some embodiments.

In some embodiments, an isotropic etching process step, such as isotropic etch 800, may be used to remove portions of the bulk substrate extending beyond interior feature depth 300. Such a removal step may be referred to as an "undercutting" as it provides local isolation of device 1000 from remaining substrate 906, as introduced in proceeding paragraphs. Isotropic etch 800 may resemble a crystallographic etching technique, an isotropic plasma etching technique, a wet etching technique, and/or any other processing step(s) that result in an undercutting of substrate 900 with planar surface 904.

In some embodiments, a length of time to run isotropic etch 800 may be determined such that a continuous channel may be formed, wherein the channel may have a continuous width of channel width 902, which is equal to a width of device 1000. As shown in FIG. 9, the continuous channel may be bounded via the second layer of the conformally deposited material along a width dimension. The continuous channel may also have a depth that is at least equal to channel depth 600 such that device 1000 may be locally isolated from remaining substrate 906 following isotropic etch 800. For example, device 1000 may have a depth of approximately 200 nm, while channel depth 600 may have a depth of approximately 800 nm (e.g., four times as deep as a depth of device 1000).

As shown via planar surface 904, a bottom surface 1206 of device 1000 may be smooth and free of roughness larger than a scale of approximately 10 nm, according to some embodiments. Furthermore, planar surface 904 may additionally refer to a straightness of planar surface 904 wherein said surface is free of a substantial incline or slant along bottom surface 1206 of device 1000. A person having ordinary skill in the art should understand that planar surface 904 may refer to a crystallographic surface or isotropically etched surface of device 1000, as shown in FIG. 9, and that referencing a result of planar surface 904 being free of roughness, etc. due to a method described via FIGS. 1-12 is not meant to exclude additional surfaces of device 1000 (e.g., top surface 1202, side surface 1204, side surface 1208, etc.) from also being planar, free of roughness, smooth, etc.

In addition, undercutting of substrate 900 may result in trench 302 being prepared to be formed into through-hole 1002, wherein there is no more bulk substrate material vertically beneath the first and second layers of the conformally deposited material on the bottom surface of trench 302, therefore forming a cylindrical hole extending between top surface 1202 and bottom surface 1206 following mask and conformal deposition material removal 908. In some embodiments, remaining mask material and first and second layers of the conformally deposited material may be removed via mask and conformal deposition material removal 908 such that device 1000 and its corresponding features are shaped using the bulk substrate material. A person having ordinary skill in the art should understand that mask and conformal deposition material removal 908 may resemble multiple fabrication processing steps which may remove a mask material (e.g., photoresist) and the conformally deposited material collectively, sequentially, etc., according to some embodiments.

Figure 12:
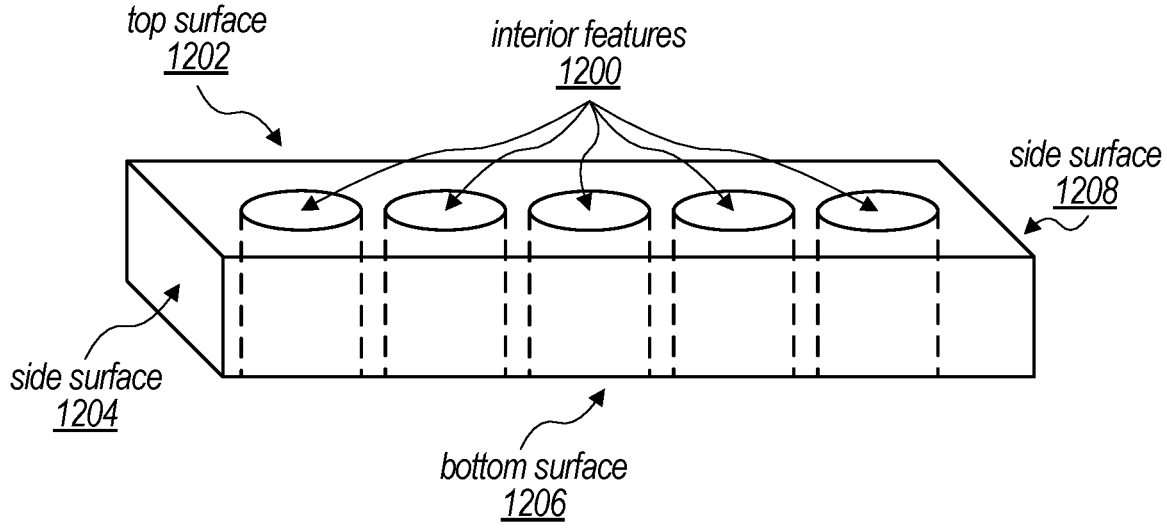
FIG. 12 illustrates a three-dimensional view of a formed device fabricated via a fabrication process described in FIGS. 1-12 herein, according to some embodiments.

FIG. 10 illustrates a result of removing mask and conformal deposition material as part of a fabrication process described via FIGS. 1-12 herein, and FIG. 11 illustrates a top view of the formed device, according to some embodiments. Furthermore, FIG. 12 illustrates a three-dimensional view of the formed device, according to some embodiments.

As shown in FIG. 10, device 1000 comprises through-hole 1002 within side surfaces of device 1000. As shown in a top view of device 1000 in FIG. 11 and via interior features 1200 in FIG. 12, through-hole 1002 may be one of several cylindrical holes that extend between top surface 1202 and bottom surface 1206. As additionally described with regard to FIGS. 14-16 herein, said holes may be cylindrically designed, or may have three-dimensional rectangular designs, etc., according to a particular mask patterning 102 processing step. Through-holes 1002 may additionally have different diameters, such as that which is shown with regard to fabricated device 1400, and/or different spacings between respective through-holes 1002, such as that which is shown with regard to fabricated device 1500.

In some embodiments, FIGS. 1-12 may resemble visual representations of a fabrication "recipe" used to form device 1000. For example, program instructions may be written by, provided from, and/or executed via a computing device for one or more pieces of equipment such as lithography tools, deposition tools, plasma etching tools, etc. in order to execute a protocol for fabrication processes described herein in order to form device 1000, device 1400, device 1500, device 1600, etc.

FIG. 13 is a flowchart illustrating a process of fabricating features using bulk substrate material, according to some embodiments.

In some embodiments, a fabrication process such as that which is described via FIGS. 1-12 may additionally be described via blocks 1300, 1302, and 1304. In block 1300, a bulk substrate may be received for use in fabricating a device configured to interact with light (e.g., device 1000, device 1400, device 1500, device 1600, etc.) from said bulk substrate material. In some embodiments, the received bulk substrate material may arrive with photoresist spun onto a top surface, such as that which is shown in FIG. 1. In other embodiments, the received bulk substrate material may arrive with a clean and exposed top surface, and photoresist may be spun onto the top surface as part of a first step in mask patterning 102, as described above.

In block 1302, portions of the bulk substrate material are removed in order to form side surfaces of a given device (e.g., side surfaces 1204 and 1208) and to form interior features of the given device (e.g., trench 302). A person having ordinary skill in the art should understand that such processing steps may occur simultaneously (e.g., via vertical plasma etch 200), or sequentially, according to a particular mask pattern used in mask patterning 102.

In block 1304, remaining portions of the bulk substrate material extending beyond a depth of interior features formed via processing step(s) described in block 1302 may be removed, which may cause a planar surface to be formed on a bottom surface of the given device. A person having ordinary skill in the art should understand that, given a context of fabrication processing steps described with regard to FIGS. 1-12 herein, block 1304 may describe multiple processing steps. For example, prior to removing said remaining portions, interior features of the given device may be protected via one or more conformal deposition processing steps (e.g., conformal deposition 304, conformal deposition 602, etc.). Furthermore, said removal may refer to portions of the bulk substrate material removed via vertical plasma etch 400 and via isotropic etch 800, according to some embodiments. Furthermore, a process flow diagram such as that which is described in FIG. 13 may additionally be used to fabricate a variety of devices from bulk substrate material, such as device 1000, device 1400, device 1500, device 1600, etc., and therefore some blocks of blocks 1300, 1302, and 1304 may be repeated in order to fulfill design requirements of a given device.

Figures 14, 15, 16:
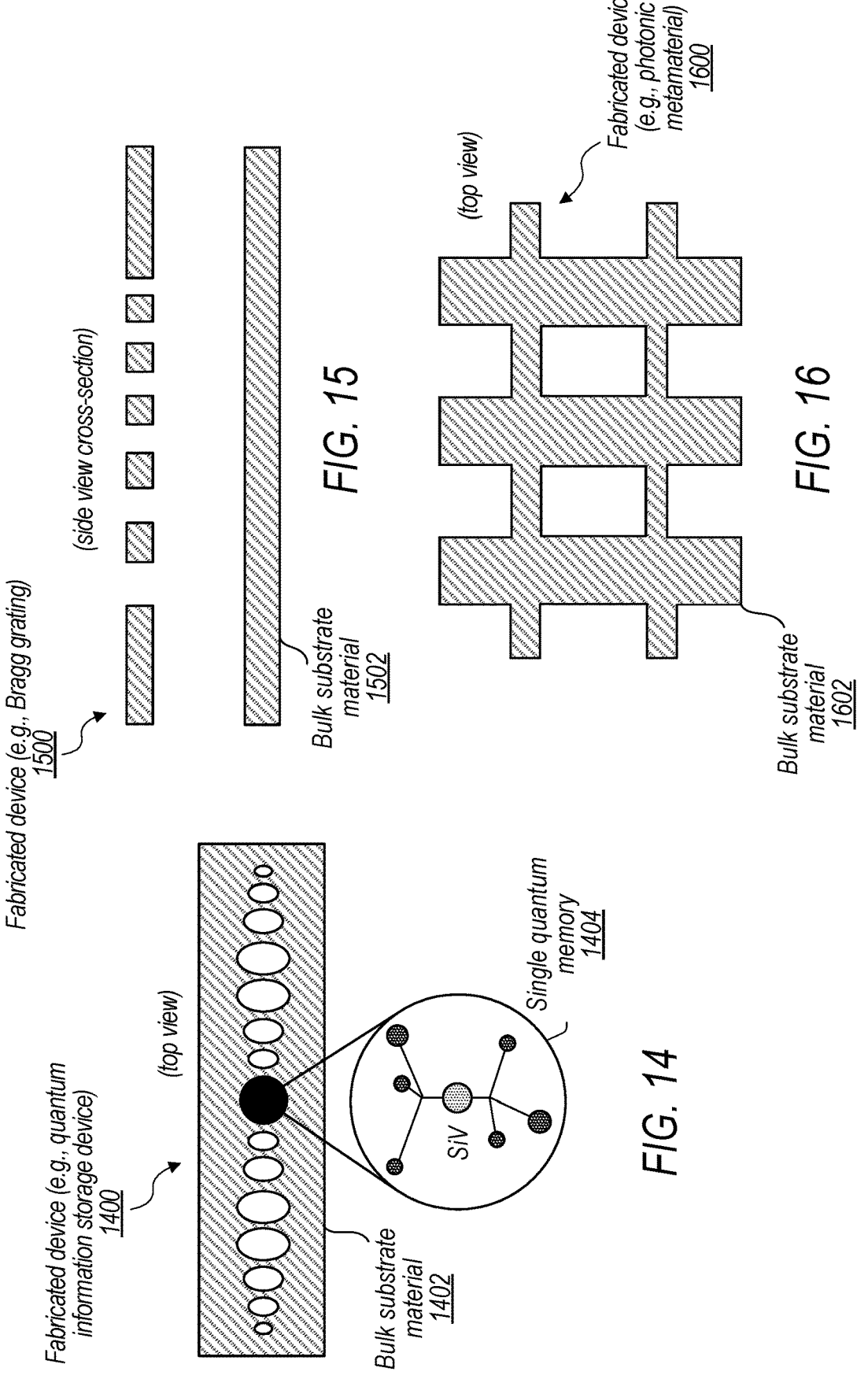
FIG. 14 illustrates an example of a device (e.g., a quantum information storage device) that may be fabricated using fabrication processes such as those described herein, according to some embodiments.
FIG. 15 illustrates another example of a device (e.g., a Bragg grating device) that may be fabricated using fabrication processes such as those described herein, according to some embodiments.
FIG. 16 illustrates yet another example of a device (e.g., a photonic metamaterial device) that may be fabricated using fabrication processes such as those described herein, according to some embodiments.

FIG. 14 illustrates an example of a device (e.g., a quantum information storage device) that may be fabricated using fabrication processes such as those described herein, according to some embodiments.

In some embodiments, fabrication process methods and techniques such as those described with regard to FIGS. 1-13 herein may be applied for formation of various devices.

For example, fabricated device 1400 may resemble a quantum information storage device which may be configured to interact with light. Fabricated device 1400 may be configured to receive photons in a superposition state to an on-chip storage (e.g., respective quantum memories patterned into bulk substrate material 1402 such as single quantum memory 1404). In some embodiments, fabricated device 1400 may extend beyond regions depicted in FIG. 14, with through-holes and single quantum memory 1404, such that an additional portion of fabricated device 1400 may resemble a photonic waveguide configured to receive incoming photons. Fabricated device 1400 may then be configured to trap light via through-holes shown in FIG. 14 which may function as mirrors, according to some embodiments.

In some embodiments, quantum memories patterned into fabricated device 1400 may include nanophotonic cavities, such as the nanophotonic cavity shown in single quantum memory 1404, which illustrates a silicon vacancy in diamond structure. In such embodiments, the silicon vacancies are embedded into nanophotonic cavities within bulk substrate material 1402, which may be diamond in such cases. As fabricated device 1400 may be fabricated using methods and techniques described herein for fabricating devices from bulk substrate material, bulk substrate material 1402 (e.g., bulk diamond material) may have improved material properties in comparison to a thin film diamond material, therefore providing enhanced device performance, functionality, and durability. A silicon vacancy in diamond structure, such as single quantum memory 1404, may act as a quantum memory storage, and a corresponding nanophotonic cavity (e.g., through-holes patterned with diamond, etc.) may allow light to interface with said silicon vacancy in diamond structure. In other embodiments, however, quantum memories patterned into bulk substrate material 1402 may resemble other interior features embedded into fabricated device 1400, such as nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc. In such embodiments, bulk substrate material 1402 may be diamond or any other material that may be provided in bulk substrate form, and methods and techniques described herein may then be used to form such interior features according to a given quantum memory architecture.

FIG. 15 illustrates another example of a device (e.g., a Bragg grating device) that may be fabricated using fabrication processes such as those described herein, according to some embodiments.

In some embodiments, fabrication process methods and techniques such as those described with regard to FIGS. 1-13 herein may be applied to fabricate a device from bulk substrate material 1502 such as fabricated device 1500, which may resemble a Bragg grating device configured to interact with light. A person having ordinary skill in the art should understand that a Bragg grating device may interact with light in various ways, such as to reflect certain wavelength(s) of light, filter out certain wavelength(s) of light, amplify certain wavelength(s) of light, scatter certain wavelength(s) of light, and/or interact with light in various other ways according to the Bragg condition. An example configuration of a Bragg grating device is shown in FIG. 15, however various other configurations of Bragg grating devices and/or Bragg coupler devices may exist that may also utilize methods and techniques described herein for fabricating Bragg grating devices from bulk substrate material, and embodiments shown in FIG. 15 are not meant to be restrictive.

As shown in FIG. 15, fabricated device 1500 may include multiple interior features (e.g., through-holes, as shown in the side view cross-section), which may be formed via process steps described in at least blocks 1300-1304, for example. Widths and depths of said interior features may be designed to be periodic in such a way that, collectively, they are configured to interact with light in at least some of the ways described above. As shown in FIG. 15, through-holes with various spacings and/or diameters may be designed via a given masking pattern and interior feature depths, respectively (see also description pertaining to mask patterning 102 and interior feature depth 300 herein). Furthermore, such through-holes may be optically isolated from remaining bulk substrate material, as shown in the figure, such that free space or air may reside between the through-holes and the remaining bulk substrate material when viewing fabricated device 1500 along the vertical dimension.

FIG. 16 illustrates yet another example of a device (e.g., a photonic metamaterial device) that may be fabricated using fabrication processes such as those described herein, according to some embodiments.

In some embodiments, fabrication process methods and techniques such as those described with regard to FIGS. 1-13 herein may be applied to fabricate a device from bulk substrate material 1602 such as fabricated device 1600, which may resemble a photonic metamaterial device (also referred to as a photonic metasurface, optical metamaterial, etc.) configured to interact with light. A person having ordinary skill in the art should understand that a photonic metamaterial device may interact with light in various ways according to physical conditions of negative permeability and negative permittivity, such as cloaking (e.g., shielding from potential electromagnetic interactions, etc.) and/or otherwise affecting a local electromagnetic environment of the fabricated device. An example configuration of a photonic metamaterial device is shown in FIG. 16, wherein a grid or lattice pattern also known as "cells" are collectively configured to interact with light. However, various other configurations of photonic metamaterial devices (chiral designs, etc.) may exist that may also utilize methods and techniques described herein for fabricating photonic metamaterial devices from bulk substrate material, and embodiments shown in FIG. 16 are not meant to be restrictive. As shown in FIG. 16, fabricated device 1600 may include multiple interior features (e.g., rectangular "cells" formed in a grid pattern), which may be formed via process steps described in at least block 1302, for example. Widths and depths of said interior features may be designed to be periodic and/or repeating in such a way that, collectively, they are configured to interact with light in at least some of the ways described above.

Figure 17:
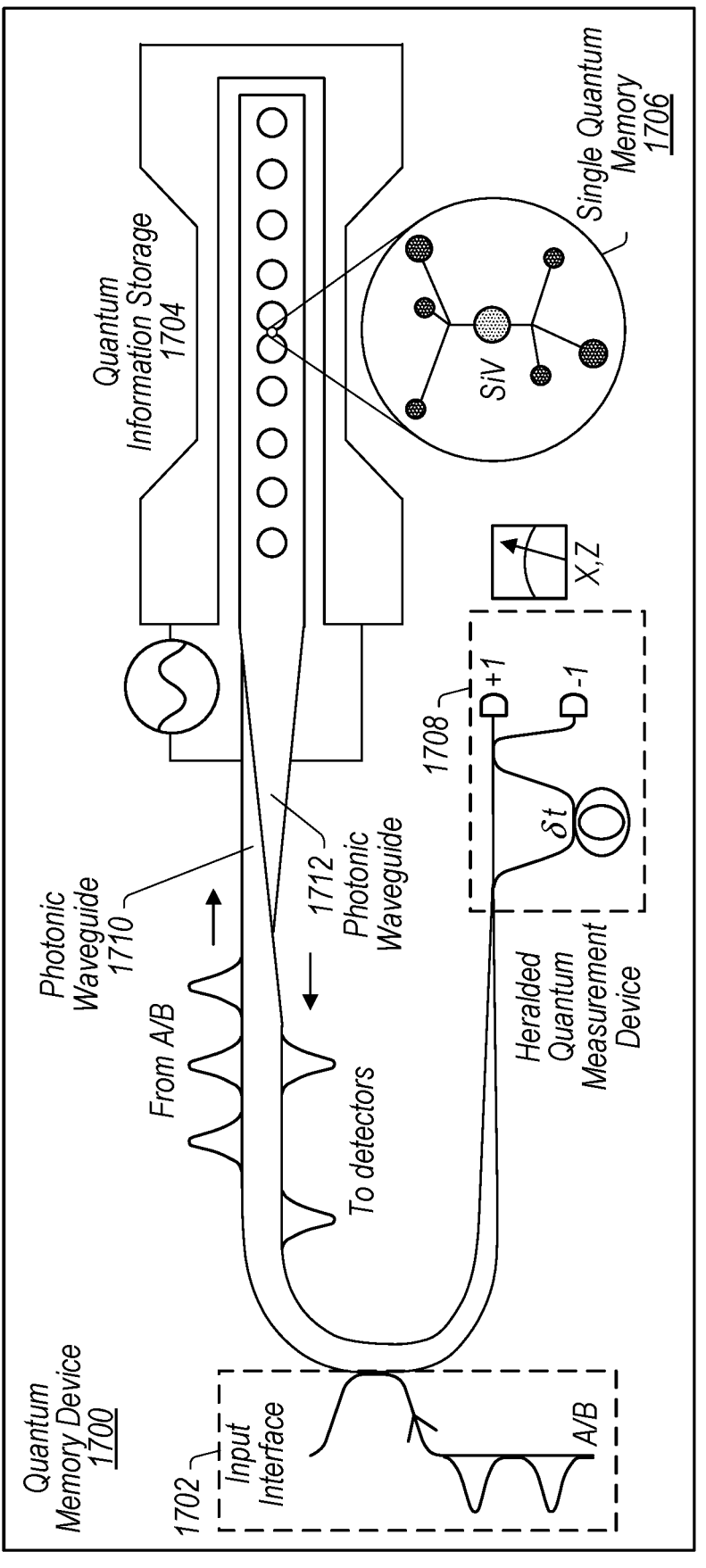
FIG. 17 illustrates an example of a quantum memory device, wherein quantum information storage device(s) of the quantum memory device may be fabricated from bulk substrate material using fabrication processes such as those described herein, according to some embodiments.

FIG. 17 illustrates an example of a quantum memory device, wherein quantum information storage device(s) of the quantum memory device may be fabricated from bulk substrate material using fabrication processes such as those described herein, according to some embodiments.

In some embodiments, quantum memory devices may provide a method of receiving, storing, and providing quantum information. In some cases, quantum memory devices may be deployed for use in large-scale optical fiber networks and/or quantum entanglement networks, for example as quantum repeaters, that store and effectively connect distributed entangled particles to provide secure, long-distance communications. In such applications, quantum memory device 1700 may function to control the tuning (e.g., adjustments to the local electrical, optical, thermal, electromechanical environment) of quantum memories (e.g., single quantum memory 1706) housed within quantum memory device 1700.

In some embodiments, a quantum memory device that includes quantum information storage devices, such as fabricated device 1400, may include similar arrangements as quantum memory device 1700 illustrated in FIG. 17. Though in some embodiments, other quantum memory device configurations may be used. Quantum memory device 1700 includes in input interface 1702 that receives particles in a superposition state to quantum information storage 1704, which comprises single quantum memory 1706, and may be configured to couple to heralded quantum measurement device 1708 via photonic waveguide layer 1712. For example, single quantum memory 1706 illustrates a silicon vacancy in diamond structure. Though in some embodiments, other structures such as: nitrogen-vacancy in diamond, trapped atoms, ensemble doped crystals, atomic vapors, silicon carbide emitters, single rare earth dopants, trapped ions, superconducting qubits, quantum dots in gallium arsenide, etc. may be used. Furthermore, input interface 1702 illustrates an embodiment of a time-bin qubit encoding conversion module, however other embodiments with other input interface configurations may be used, including wavelength or mode matching.

In some embodiments, input interface 1702 may be configured to couple with photonic waveguide layer 1710. Photonic waveguide layer 1710 may be a material that may be patterned such that optical waveguides may be formed into the material (e.g., silicon nitride, lithium niobate, aluminum nitride, etc.). It may be additionally optically transparent within one or more given wavelength ranges (e.g., a visible light spectrum), and may also have nonlinear optical and/or electrooptical properties. Photonic waveguide layer 1712 may be a material fabricated from a bulk substrate via fabrication processes and methods described herein, and may be configured to host optically active quantum memories (e.g., single quantum memory 1706) within a photonic cavity described by quantum information storage 1704, according to some embodiments.

In some embodiments, quantum memory device 1700 may be configured to store quantum information corresponding to a first received entangled particle of a first pair of entangled particles in a first single quantum memory 1706 of quantum information storage 1704 and also store quantum information corresponding to a second received entangled particle of a second pair of entangled particles in a second single quantum memory 1706 of quantum information storage 1704. Quantum memory device 1700 may further be configured to perform one or more joint measurements on the first and second particles via heralded quantum measurement device 1708 without collapsing superposition states of the first and second entangled particles. The joint measurements may determine a correlation relationship between the superposition states of the entangled particles such that entanglement can be extended between the pairs of entangle particles.

Quantum memory device 1700 may be heralded, meaning that when a particle arrives to quantum memory device 1700, the quantum measurement device 1708 (or other device coupled to quantum information storage 1704 of quantum memory device 1700) issues a heralding signal announcing the arrival of the particle. In some embodiments, such a heralding signal may be used to operate an optical switch to align the switch such that the quantum memory receives a next particle from an entangled particle source with which quantum entanglement is to be distributed. Furthermore, when the second particle arrives at quantum memory device 1700 from the entangled particle source, a second heralding signal may be issued. The second heralding signal may then cause joint measurements to be performed on the first and second particles stored in quantum memory device 1700. Furthermore, the joint measurements may extend the entanglement (see also description pertaining to FIG. 18 herein). In some embodiments, quantum measurement device 1708 may perform heralding measurements and joint measurements, or in some embodiments, different quantum measurement devices 1708 may be used to perform heralding measurements and joint measurements on received particle pairs. In some embodiments, the heralding function may be performed by a quantum non-destruction measuring device that can detect a particle (e.g., photon) entering quantum memory device 1700 without causing the particle to be collapsed out of the superposition state.

In some embodiments, quantum memory device 1700 may further include a conversion interface. For example, in some embodiments, the conversion interface may convert a transmission frequency of a received particle to a different frequency. For example, in some embodiments, fiber optic links may transmit particles using different frequency wavelengths and such variations may be adjusted via a conversion interface of quantum memory device 1700. In some embodiments, the conversion interface may be located proximate to quantum memory device 1700, but may not necessarily be included in quantum memory device 1700.

In some embodiments, quantum memory device 1700 (or sets of quantum memories) may store redundant sets of particles for use in generating quantum entanglement that is to be distributed. In such embodiments, the quantum memor (ies) may perform error correction by comparing joint measurement results for multiple sets of particles. Such error correction may function as entanglement purification, in some embodiments. Also, parties at the endpoints connected via the redundantly distributed quantum entanglement may perform error correction.

In some embodiments, quantum memory device 1700 may additionally include quantum memory control devices. Note that for ease of illustration, some embodiments of the following description are given in terms of quantum memory device 1700 resembling a quantum repeater. However, in some embodiments, a quantum memory device may be used for other purposes, such as storing quantum information locally at a given location. For example, in some situations, quantum memory device 1700 may be used to store quantum information (such as in a cache) that is used by multiple locally situated quantum computers. Quantum memory control devices of quantum memory device 1700 may, for example, provide mechanisms for receiving and routing quantum information (e.g., via entangled particles) to be stored in the quantum memories of quantum memory device 1700. In another example, quantum memory control devices may provide mechanisms for receiving, sending, emitting, and/or controlling optical and/or electrical control signals to, or from, quantum information storage 1704. In yet another example, quantum memory control devices may modify the behavior of the quantum memories in quantum information storage 1704 via the use of low-frequency control signals (e.g., microwave, RF, and/or DC control signals) that may induce strain on the quantum memories. Quantum memory control devices may additionally control heat and/or gas flow onto quantum information storage 1704. Quantum memory control devices may also be used to deliver electrical control signals that result in the creation of local electromechanical strain fields near the quantum memories of quantum information storage 1704, according to some embodiments. Such electromechanical strain fields may, for example, enable for the tuning of optical and/or spin properties of quantum memories of quantum information storage 1704 for improved performance and operation of said quantum memories. This may be referred to as strain tuning of the quantum memories, according to some embodiments. In some embodiments, quantum memory device 1700 may additionally include optical fiber ports and/or electrical ports that provide access points between optical fiber cables, control signal leads, electrical wires, electrical cables, etc., located external to quantum memory device 1700, and points within quantum memory device 1700.

Furthermore, once a type of nanophotonic cavity is selected for quantum information storage 1704, quantum memory control devices may be additionally used to match the frequency of the nanophotonic cavity to the given quantum emitter (e.g., an entangled particle source) in embodiments in which quantum memory device 1700 is functioning as a quantum repeater. For example, the quantum memory control devices may be used to perform optical tuning (e.g., refractive index shift), electromechanical deformation tuning, and/or gas (e.g., $N_2$ gas) deposition tuning onto the nanophotonic cavities. In addition, control signal leads may provide electrical control signals to, and/or from, the quantum memories.

Figure 18:
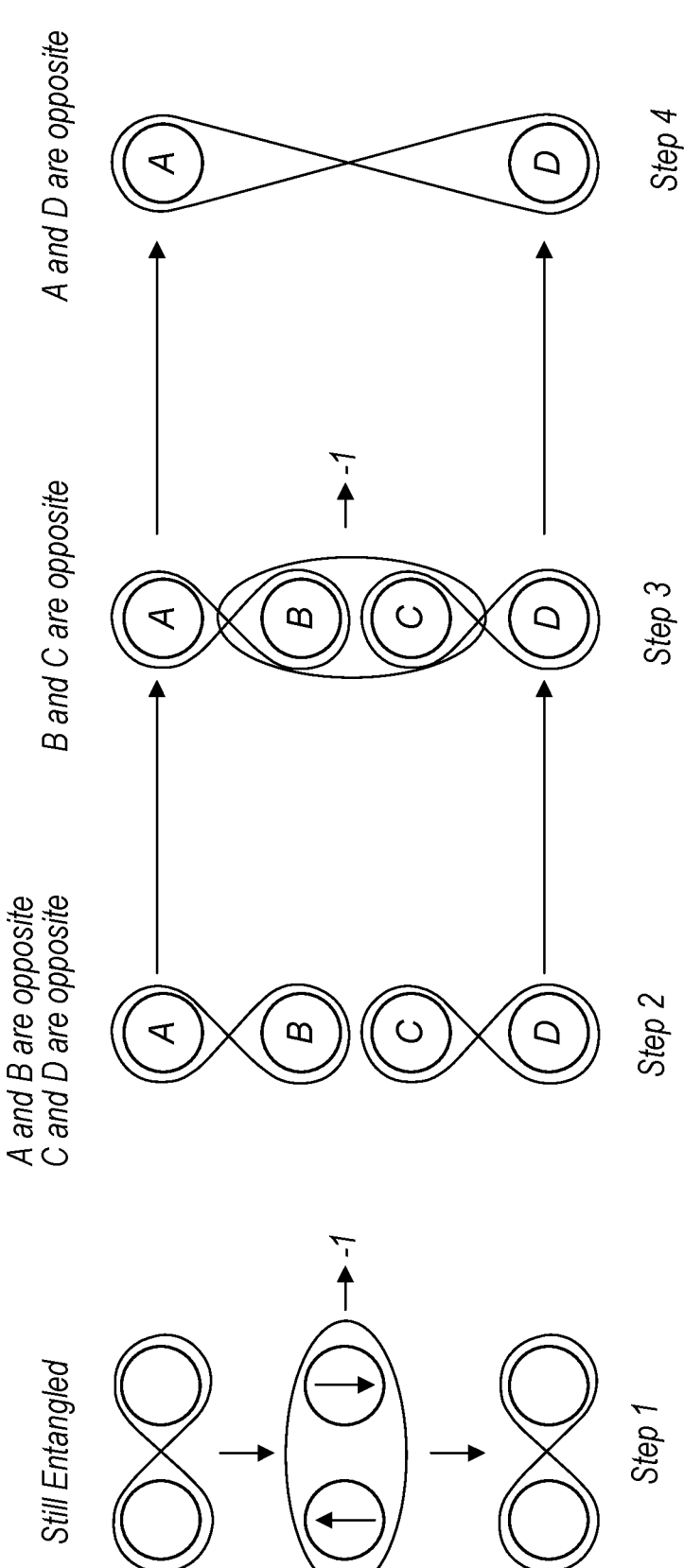
FIG. 18 is an example diagram illustrating how entanglement is extended by performing joint measurements of received particles of respective sets of entangled particles distributed via fiber optic network links to/from quantum memory devices, according to some embodiments.

FIG. 18 is an example diagram illustrating how entanglement is extended by performing joint measurements of received particles of respective sets of entangled particles distributed via fiber optic network links to/from quantum memory devices, such as quantum repeaters, according to some embodiments.

In some embodiments, joint measurements as shown in FIG. 18 may be performed for photons stored in quantum memories (e.g., single quantum memory 1706) in a quantum memory device, such as quantum memory device 1700. For example, at step 1, a joint measurement is performed that measures two particles (e.g., photons) in such a way as that the joint measurement only determines if the two particles are the same or opposite (e.g., in the same quantum state or not). This is done without revealing information about the individual particles. Then, at step 2, the entangled pairs are defined by their correlations, e.g., opposite or the same. In the example shown in FIG. 18, both A/B and C/D are entangled such that they are opposites. Next, at step 3 a joint measurement is performed on B/C with an outcome (e.g., opposite or same), which is opposite in the example case shown in FIG. 18. This tells A that its compliment is the opposite D's compliment, allowing A and D to infer they are opposites. Then, using this information at step 4 A/D the particles are now entangled such that they are always in the opposite state. In some embodiments, the joint measurements may be performed using a local two-qubit gate between B and C (e.g., a CNOT gate) and may further include measuring each bit individually. This can be understood as an entangling operation and a measurement, or conversely as a single measurement in an "entangled basis." When the joint measurements are performed in this way, the results reveal information about the correlations between particles, such as particles B and C, but not information about the particles themselves. This is due to the entanglement generated by the two-qubit operation. Such joint measurements may be performed at a quantum measurement device, according to some embodiments.

CONCLUSION

Various embodiments may further include receiving, sending or storing instructions and/or data implemented in accordance with the foregoing description implemented using a computer-accessible medium. For example, various steps of methods described herein may be implemented by the execution of program instructions executed on or across one or more processors. In some embodiments, such program instructions may be stored in a non-transitory computer-readable medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method of fabricating, from a bulk substrate, a device configured to interact with light, the method comprising:
   receiving the bulk substrate, the bulk substrate having a first width and a first depth, wherein the bulk substrate is to be used to form the device, the device comprising:
   a top surface;
   a bottom surface;
   a first side surface extending between the top surface and the bottom surface;
   a second side surface extending between the top surface and the bottom surface; and
   one or more interior features located within the first and second side surfaces and extending between the top surface and the bottom surface;
   removing material from the bulk substrate to form the first and second side surfaces of the device, the first and second side surfaces having a second width and a second depth;
   removing material from a portion of the bulk substrate between the first and second side surfaces to form the one or more interior features of the device, wherein:
   the one or more interior features have one or more respective widths that are less than the second width;
   the one or more interior features have the second depth; and
   subsequent to said removing the material from the portion of the bulk substrate between the first and second side surfaces, remaining portions of the bulk substrate remain connected at a depth extending beyond the second depth; and removing, via an isotropic etching technique, the remaining portions of the bulk substrate extending beyond the second depth to form a continuous channel having a planar surface, wherein:

the continuous channel has a width extending to a width of the device; and said removing to form the continuous channel causes the planar surface along the bottom surface of the device to be formed from the removal of the remaining portions.

2. The method of claim 1, wherein:

the device is a quantum information storage device; and the one or more interior features are configured, via the fabrication process, to form a photonic cavity, wherein the photonic cavity is configured to:

receive quantum information via respective super-positioned particles of light; and store the quantum information.

3. The method of claim 1, wherein said removing the material from the bulk substrate to form the first and second side surfaces of the device comprises:

etching, via a vertical plasma etching technique, the material.

4. The method of claim 1, wherein said removing the material from the portion of the bulk substrate between the first and second side surfaces to form the one or more interior features of the device comprises:

etching, via a vertical plasma etching technique, the material from the portion of the bulk substrate between the first and second side surfaces.

5. The method of claim 1, wherein said removing the remaining portions of the bulk substrate extending beyond the second depth to form the continuous channel comprises:

etching, via a vertical plasma etching technique, portions of the bulk substrate material extending beyond the second depth and outwards beyond the first and second side surfaces of the device, wherein said etching causes additional side surfaces of the bulk substrate material to be exposed.

6. The method of claim 5, further comprising:

depositing, prior to said etching, via the vertical plasma etching technique, a layer of an additional material onto the top surface, the first side surface, and the second side surface of the device.

7. The method of claim 6, wherein said removing the remaining portions of the bulk substrate extending beyond the second depth to form the continuous channel further comprises:

etching, via the isotropic etching technique, the material from the portion of the bulk substrate located between the first and second side surfaces of the device and extending beyond the second depth to form the bottom surface of the device.

8. The method of claim 7, wherein said removing the remaining portions of the bulk substrate extending beyond the second depth to form the continuous channel further comprises:

prior to said etching, via the vertical plasma etching technique, the material from the portion of the bulk substrate located between the first and second side surfaces and vertically beneath the bottom surface of the device, depositing an additional layer of the additional material onto the top surface of the device, the first side surface of the device, the second side surface of the device, and the additional side surfaces of the bulk substrate material.

* * * * *